United States Patent
Iyer et al.

(10) Patent No.: US 6,560,000 B2
(45) Date of Patent: May 6, 2003

(54) WAVELENGTH-DEPENDENT OPTICAL SIGNAL PROCESSING USING AN ANGLE-TO-OFFSET MODULE

(75) Inventors: Rajiv Iyer, Ottawa (CA); Thomas Ducellier, Ottawa (CA); Robert Ian MacDonald, Manotick (CA)

(73) Assignee: JDS Uniphase Inc., Ottawa (CA)

( * ) Notice: Subject to any disclaimer, the term of this patent is extended or adjusted under 35 U.S.C. 154(b) by 0 days.

(21) Appl. No.: 09/988,506

(22) Filed: Nov. 20, 2001

(65) Prior Publication Data

US 2002/0076146 A1 Jun. 20, 2002

(30) Foreign Application Priority Data

| Nov. 20, 2000 | (CA) | ............................................. | 2326362 |
| Dec. 6, 2000 | (CA) | ............................................. | 2327862 |
| Apr. 2, 2001 | (CA) | ............................................. | 2342719 |

(51) Int. Cl.[7] ............................. G02F 1/01; H04J 14/02; G02B 17/00; G02B 6/26; G02B 6/42
(52) U.S. Cl. ..................... 359/238; 359/117; 359/124; 359/127; 359/707; 359/732; 385/16; 385/18; 385/24; 385/37; 385/47; 385/140
(58) Field of Search .................. 359/237, 238, 359/113, 114, 115, 117, 123, 124, 125, 127, 128, 139, 707, 732; 385/3, 4, 16, 17, 18, 24, 33, 37, 47, 140

(56) References Cited

U.S. PATENT DOCUMENTS

| 5,524,153 | A | | 6/1996 | Laor | ............................ | 385/16 |
| 5,914,801 | A | | 6/1999 | Dhuler et al. | ................. | 359/230 |
| 6,002,818 | A | | 12/1999 | Fatehi et al. | .................... | 385/17 |
| 6,005,993 | A | | 12/1999 | MacDonald | .................. | 385/16 |
| 6,005,998 | A | | 12/1999 | Lee | .............................. | 385/33 |
| 6,008,920 | A | * | 12/1999 | Hendrix | ...................... | 359/127 |
| 6,087,747 | A | | 7/2000 | Dhuler et al. | ................. | 310/90 |
| 6,097,858 | A | | 8/2000 | Laor | ............................. | 385/16 |
| 6,097,859 | A | | 8/2000 | Solgaard et al. | ............... | 385/17 |
| 6,097,860 | A | | 8/2000 | Laor | ............................. | 385/17 |
| 6,101,299 | A | | 8/2000 | Laor | ............................. | 385/16 |
| 6,134,042 | A | | 10/2000 | Dhuler et al. | ................ | 359/224 |
| 6,137,941 | A | * | 10/2000 | Robinson | ..................... | 385/140 |
| 6,181,853 | B1 | * | 1/2001 | Wade | ............................ | 385/37 |
| 6,236,780 | B1 | * | 5/2001 | Wade | ............................ | 385/37 |
| 6,253,001 | B1 | | 6/2001 | Hoen | ............................ | 385/17 |
| 6,289,145 | B1 | | 9/2001 | Solgaard et al. | ............... | 385/17 |
| 6,404,958 | B1 | * | 6/2002 | Boye et al. | ..................... | 385/47 |
| 6,430,332 | B1 | * | 8/2002 | Laor et al. | ..................... | 385/18 |
| 6,434,291 | B1 | * | 8/2002 | Kessler et al. | ................. | 385/24 |

FOREIGN PATENT DOCUMENTS

WO    WO 99/66354    12/1999

* cited by examiner

Primary Examiner—Loha Ben
(74) Attorney, Agent, or Firm—Neil Teitelbaum

(57) ABSTRACT

An optical device comprises a dispersion element, a reflector, and an angle-to-offset (ATO) element. The angle-to-offset (ATO) element has optical power. The dispersion element is positioned in or near a focal plane of the ATO element and adapted to separate an input wavelength division multiplexed (WDM) light beam received from an input port of the optical device into two or more channel light beams. The reflector is positioned in or near a focal plane of the ATO element and arranged to receive the channel light beams from the dispersion element via the ATO element. The reflector is designed to reflect at least one of the channel light beams toward a respective output port of the optical device. With this arrangement, the dispersion element, reflector and ATO element cooperate to optically demultiplex the input WDM light beam. Additional optical elements arranged in the propagation path between the reflector and the output port(s) and/or between the input port and the dispersion element can be used to provide further optical signal processing functionality such as dynamic channel equalization, add drop, or wavelength switching.

26 Claims, 7 Drawing Sheets

WAVELENGTH-DEPENDENT OPTICAL SIGNAL PROCESSING USING AN ANGLE-TO-OFFSET MODULE

CROSS-REFERENCE TO RELATED APPLICATIONS

This application is based on, and claims priority of, Canadian Patent Application Nos. 2,326,362, filed Nov. 20, 2000; 2,327,862, filed Dec. 6, 2000; and 2,342,719, filed Apr. 2, 2001.

MICROFICHE APPENDIX

Not Applicable.

1. Technical Field

The present invention relates to optical signal processing devices, and in particular to wavelength-dependent optical signal processing devices incorporating an angle-to-offset module.

2. Background of the Invention

In the modern communications network space, the use of wavelength division multiplexed (WDM) and dense wavelength division multiplexed (DWDM) optical signals are becoming increasingly popular. As is well known in the art, wavelength division multiplexing involves the transmission of multiple light beams through a single waveguide or optical fiber. Each light beam (which is commonly referred to as a channel) generally has a narrow range of wavelengths centered on a nominal channel or center wavelength, and normally conveys a respective stream of data traffic.

At a minimum, practical implementation of wavelength division multiplexing requires optical components capable of optically multiplexing each channel into a single waveguide, and then optically demultiplexing each of the channels from that waveguide. Conventionally, other channel-specific signal processing, such as signal regeneration; Add-Drop Multiplexing (ADM); channel equalization; gain equalization; and channel switching, have been performed electronically. That is, each channel is converted into an electronic signal, processed using conventional electronic means, and then converted back into optical signals for transmission. At lower data rates (e.g., approx. 2.5 GHz), such electronic processing systems can be cost effective. However, as data rates increase (e.g., beyond about 10 GHz), electronic signal processing systems become increasingly expensive, because of physical limitations inherent to electronic systems. Thus optical signal processing systems capable of performing complex channel-specific signal processing functions entirely in the optical domain are increasingly in demand.

Optical signal processing modules (e.g., Add-Drop Multiplexers (ADMs); Dynamic Channel Equalizers (DCEs); and switches) are known. These modules conventionally require complex opto-mechanical layouts (in which the involved optical components are not located on a common optical axis) in order to achieve the spatial separations needed to perform the desired function. The physical size and complexity of these modules increases the difficulty of maintaining adequate precision during manufacture. This inevitably results in increased costs.

Accordingly, an optical signal processing module, in which channel-specific optical signal processing can be accomplished using a simple component layout and small physical size, remains highly desirable.

SUMMARY OF THE INVENTION

Accordingly, an object of the present invention is to provide an optical signal processing module capable of channel-specific optical signal processing using a simple, physically compact component layout.

Accordingly, an aspect of the present invention provides an optical device for wavelength dependent processing of optical signals. The optical device comprises a dispersion element, a reflector, and an angle-to-offset (ATO) element. The angle-to-offset (ATO) element has at least one focal plane having a focal length approximately equal to a near zone length or Rayleigh range of the beam of light incident on the ATO element. The dispersion element is adapted to separate an input wavelength division multiplexed (WDM) light beam received from an input port of the optical device into two or more channel light beams. The reflector is arranged to receive the channel light beams from the dispersion element via the ATO element. The reflector is designed to reflect at least one of the channel light beams toward a respective output port of the optical device. With this arrangement, the dispersion element, reflector and ATO element cooperate to demultiplex the input WDM light beam optically. Additional optical elements arranged in the propagation path between the reflector and the output port(s) and/or between the input port and the dispersion element can be used to provide further optical signal processing functionality, as well, the reflector can be modified to change functionality.

The dispersion element may be provided as a diffraction grating disposed in or near a focal plane of the ATO element.

The ATO element may be either a curved mirror having a focal plane, or a refractive lens. In the case of a mirror, both the dispersion element and the reflector are disposed in or near the focal plane. In the case of a lens, the dispersion element and the deflector are disposed in or near respective opposite focal planes of the lens.

In some embodiments, the reflector comprises an array of two or more reflective elements disposed in or near a focal plane of the ATO element. Each reflective element can be arranged in a propagation path of a respective channel light beam from the dispersion element, via the ATO element.

In some embodiments, each reflective element is fixed. The reflective elements may be oriented at a common angle, or at a respective unique angle with respect to the dispersion plane of the dispersion element. In other embodiments, each reflective element is independently movable, either under analog control or bi-stable. In either case, each reflective element may be provided as either a mirror or a total internal reflection (TIR) element. In some embodiments, each TIR element may be independently controllable to selectively frustrate (or otherwise inhibit) reflection of light.

In some embodiments, an optical switch is provided for switching each channel light beam to a selected output waveguide. The optical switch preferably includes first and second MEMS arrays, each of which are disposed in or near a focal plane of the ATO element.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
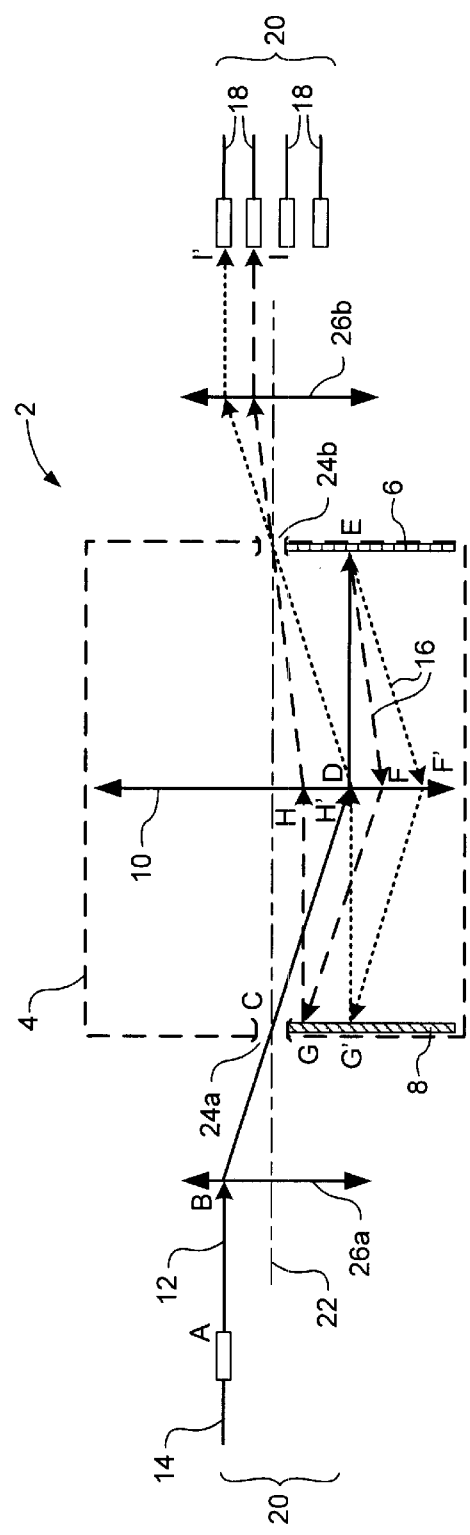
FIG. 1 is a schematic illustration showing principle elements and operation of a first embodiment of the present invention implemented as a wavelength demultiplexer.

The present invention provides a structurally simple and compact optical signal processor that can be readily adapted to perform multiple optical signal processing functions. FIG. 1 illustrates principle elements of an embodiment of the present invention implemented as a wavelength multiplexer/demultiplexer (Mux/Demux).

As shown in FIG. 1, a wavelength Mux/Demux 2 in accordance with the present invention includes an optical core 4 defined by a dispersion element 6 and a reflector 8 separated by an optical element 10 having optical power. Both the dispersion element 6 and the reflector 8 are conveniently disposed in or near a focal plane of the optical element 10.

The dispersion element 6 can be provided as a conventional diffraction grating, and is arranged to receive a WDM light beam 12 from an input waveguide 14. In all figures, the dispersion element 6 is shown perpendicular to the optical axis for simplicity only. As is well known in the art, the position can be different. The dispersion element 6 operates to reflect light of the WDM light beam 12 through an angle that is a function of wavelength, in a manner well known in the art. Thus the dispersion element 6 causes a spatial (angular) separation of the channels multiplexed within the WDM light beam 12.

As may be seen in FIG. 1, the reflector 8 operates to reflect diffracted channel light beams 16 received from the dispersion element 6 toward one or more output waveguides 18. As will be described in greater detail below, the design of the reflector 8 can be suitably selected in accordance with the desired signal processing functionality. Additional optical elements (e.g., dispersion elements, reflectors and MEMS arrays) can also be inserted into the optical path between the reflector 8 and the output waveguide(s) 18, as will also be described in greater detail below.

The Optical element 10 having optical power may be either a curved (focusing) mirror or a refractive lens. In the illustrated embodiments, the optical element 10 is shown as a refractive lens for ease of illustration only. In embodiments in which the optical element 10 is a mirror, the optical paths illustrated in the appended figures are "folded" about the plane of the ATO element, but are otherwise closely similar to those illustrated in the figures. The use of a mirror as the optical element 10 may have an advantage over a lens, in that a mirror enables folding of optical paths, and thereby permits a more compact design.

While not essential for the purposes of the present invention, the optical element 10 is preferably a "true" Angle-To-Offset (ATO) element whose focal length approximately corresponds to the near zone length (multi mode) or Rayleigh range (single mode) of the beam of light incident on the ATO element. The use of a true ATO element means that the size (i.e., the diameter) of a light beam routed through the optical core 4 is substantially the same at both input and output optical bypass 24a, 24b of the optical core 4. Assuming optically identical optics 26a and 26b, and identical input micro-collimators at A and I, the beam sizes will also be the same at the waveguides 14 and 18. This feature is useful for optimizing coupling of the beam between input and output waveguides 14 and 18. However, it is not strictly necessary for optical signal processing in accordance with the present invention.

On the other hand, in all cases, the element 10 operates to redirect any beam propagating at a given angle at the front focal plane to a fixed offset at the back focal plane and vice versa. This is also a characteristic of a true ATO element. Accordingly, for the purposes of the present invention, the term "ATO" will be used in describing the element 10, even though true ATO functionality is not strictly required. As illustrated, lenses 26 and 10 serve as a telecentric relay to image the input waveguides to the dispersion element. AS well lens 10 provides switching functionality. It should be noted that other optical systems could be used to image the input to the dispersion element. This also follows for the output imaging system.

In general, the input and output waveguides 14 and 18 are arranged in respective fiber bundles 20 arranged along a common optical axis 22 on opposite sides of the optical core 4. Each fiber bundle 20 includes an array of waveguides, each of which may terminate in a microlens, or other convenient lens that operates to guide a light beam into (and/or out of) the associated waveguide.

Each fiber bundle 20 is associated with a respective optical bypass 24 (e.g., a hole or optically transparent region) of the optical core 4, through which light beams propagating to/from each waveguide can enter/leave the optical core 4. The propagation paths of light beams emerging from each waveguide of a bundle 20 are made to converge within the optical bypass 24. In the embodiment of FIG. 1, this is accomplished by means of a relay lens 26 positioned between each fiber bundle 20 and its associated optical bypass 24, and separated from the optical bypass 24 by a distance that approximately corresponds with the focal length of the relay lens 26. This arrangement facilitates a compact design of the optical core 4.

Operation of the embodiment of FIG. 1 to demultiplex a received WDM light beam 12 is shown by the solid and dashed lines of FIG. 1. For ease of illustration, the multiple WDM light beam 12 is illustrated by a solid line, while demultiplexed channel light beams 16 are shown as dashed lines. Similarly, for ease of illustration, the WDM light beam 12 is considered to be composed of two channels. It will be appreciated, however, that more than two channels can be readily accommodated by the present invention. Thus, a WDM light beam 12 enters the demuxer 2 through a respective input waveguide 14 (at A), is deflected by the relay lens 26a (at B), and enters the optical core 4 through optical bypass 24a (at C). As the input WDM light beam 12 propagates through the optical core 4, it is deflected by the ATO element 10 (at D), and made incident upon the dispersion element 6 (at E). As mentioned previously, the dispersion element 6 operates to reflect light of the WDM light beam 12 through an angle that is a function of wavelength, and thus causes spatial separation of the channels of the WDM light beam 12. Thus, each channel light beam 16 propagates away from the dispersion element 6 at a unique angle, and passes through the ATO element 10 (at F and F') which deflects the channels toward the reflector 8. As may be seen in FIG. 1, the ATO element 10 operates to convert the angular separation of each channel light beam 16 into a lateral offset at the focal planes, so that all of the channel light beams 16 are parallel when they hit the reflector 8 (at G and G').

In the embodiment of FIG. 1, the reflector 8 may be provided as a simple fixed mirror (having one or more fixed reflective surfaces) designed to reflect incident channel light beams 16 through a common angle. Thus the channel light beams 16 are reflected by the reflector 8 (at G and G') and remain parallel until they pass through the ATO element 10 (at H and H'), which deflects the parallel channel light beams 16 to respective output waveguides 18 (at I and I') via their associated optical bypass 24b and output relay lens 26b.

Thus it will be seen that the embodiment of FIG. 1 will operate to demultiplex an input WDM light beam 12, and output the demultiplexed channel light beams 16 through respective output waveguides 18. As will be appreciated, reversing the propagation direction of the light beams will perform the reciprocal operation (that is, the demuxer becomes a muxer). Thus, channel light beams 16 entering the optical core at I and I' will be multiplexed into a single WDM light beam 12, which leaves the muxer 2 through the "input" waveguide 14 at A.

Figure 2:
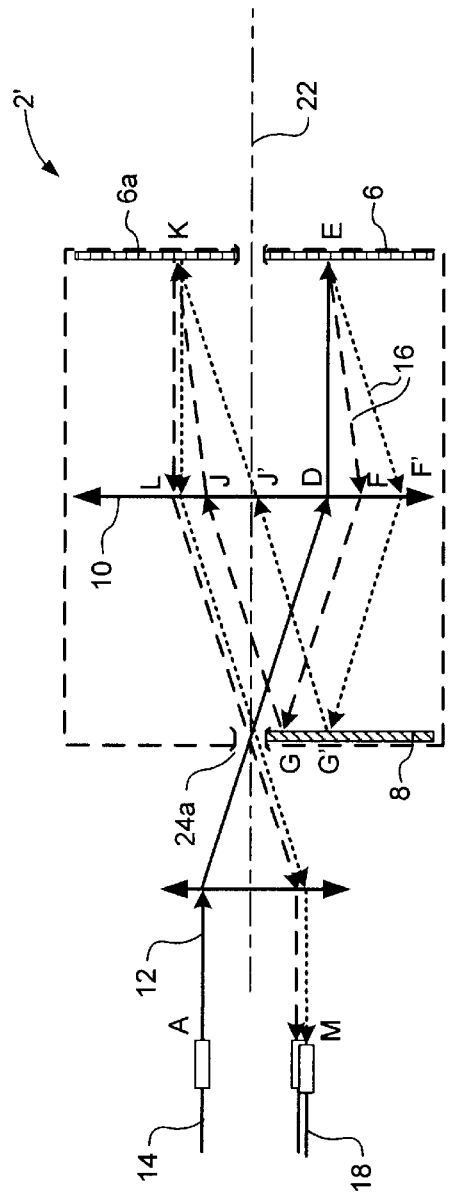
FIG. 2 is a schematic illustration showing principle elements and operation of a second embodiment of the present invention implemented as a wavelength demultiplexer.

In practice, the channel light beams 16 are not truly mono-chromatic. Typically, each channel light beam 16 has a range of wavelengths. Because the dispersion element 6 causes wavelength-dependent reflection of light, the channel light beams 16 will be slightly dispersed by the dispersion element 6. Because of this, coupling of light into the output waveguides 18 will involve wavelength dependent insertion losses. FIG. 2 illustrates a variation of the embodiment of FIG. 1, in which the dispersion of each channel light beam 16 is corrected, to yield so-called "flat-top" performance.

As described above, dispersion of each channel light beam 16 is caused by wavelength-dependent reflection of light by the dispersion element 6. Thus it will be apparent that this dispersion can be corrected by directing the parallel channel light beams 16 back through the ATO element 10 to the dispersion element 6, which recombines the channel light beams 16. Thus in the embodiment of FIG. 2, the reflector 8 is arranged to deflect the parallel channel beams 16 (at G and G') through the ATO element 10 (at J and J') to the dispersion element 6a (at K).

In order to prevent multiplexing of the channel light beams 16 at K (which would clearly negate the demultiplexing operation of the device), the reflector 8 is designed to cause a lateral offset of each of the channel light beams 16 hitting the dispersion element 6a. As a result, each of the channel light beams 16 falls on the dispersion element 6a at K arrayed along an x axis perpendicular to the page (in FIG. 2) so that spatial separation of the channel light beams 16 is preserved. The plane of the page is defined as y-z, y being the "vertical" orientation of the drawing and z being the "horizontal" orientation of the drawing. This can be accomplished using a reflector 8 similar to that illustrated in FIG. 3a. As may be seen in FIG. 3a, the reflector 8 is divided into a plurality of facets 28 (nominally one facet for each channel light beam). All of the facets 28 are fixed at a common angle with respect to the dispersion plane of the dispersion element 6a, e.g., θx (theta x) so that all of the channel light beams 16 will be focused by the ATO element 10 onto the dispersion element 6a at a common height. The dispersion plane is defined as the plane perpendicular to a grating surface and perpendicular to the grating lines. However, each facet is also arranged at a unique angle θy (theta y) (perpendicular to the plane of the page in FIG. 2), so that each channel light beam 16 will be projected out of the plane of the page of FIG. 2, and thus be targeted to a different horizontal position of the dispersion element 6a.

Following reflection of the channel light beams 16 from the dispersion element 6a (at K) the now horizontally separated light beams 16 pass through the ATO element 10 (at L), and are imaged onto a horizontal array of output waveguides 18 (shown schematically at M).

In the embodiment of FIG. 2, the dispersion element 6 is enlarged (relative to that of FIG. 1) in order to accommodate the second reflection of the channel light beams 16 at K. However, it will be appreciated that a separate diffraction grating element could equally be used for this purpose.

Figure 4A:
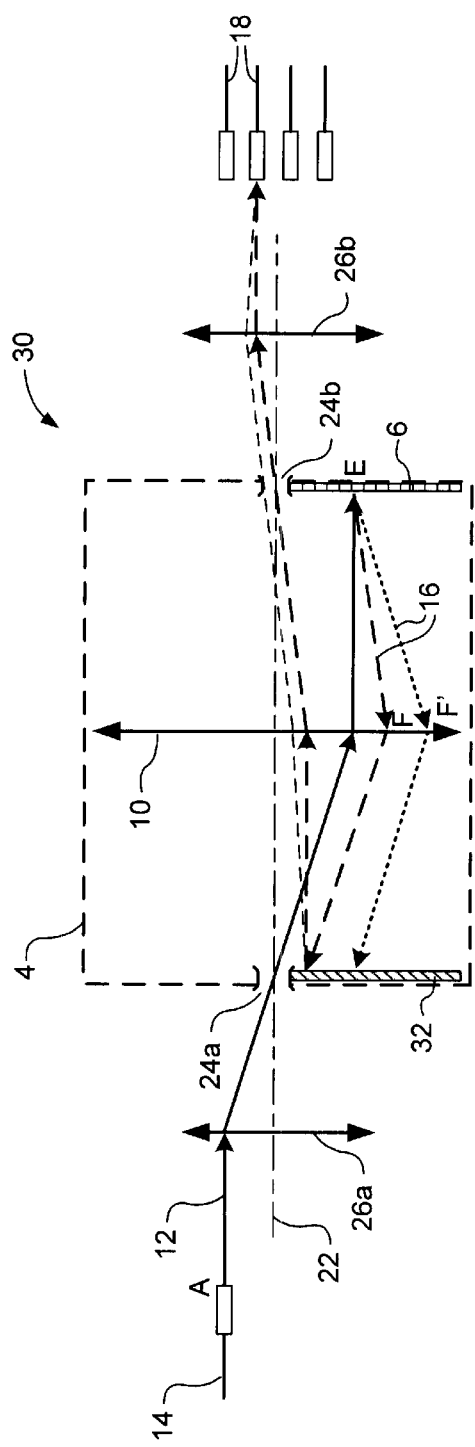
FIGS. 4a–4d are schematic illustrations showing principle elements and operation of respective alternative embodiments of the present invention implemented as a dynamic channel equalizer (DCE)
Figure 4B:
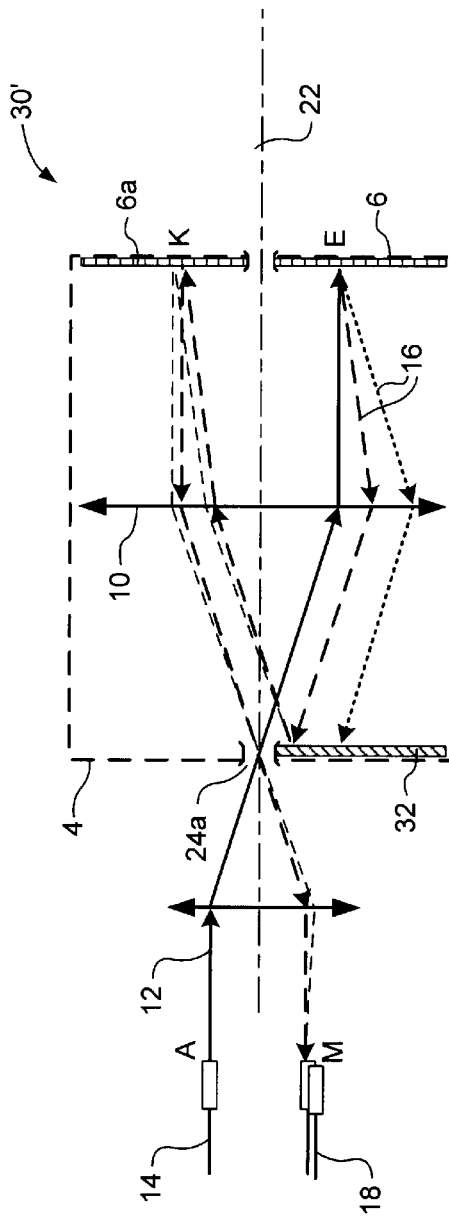

FIGS. 4a and 4b illustrate respective embodiments of the present invention implemented as dynamic channel equalizers (DCEs) 30. As is well known in the art, minimum insertion loss is obtained when a channel light beam 16 follows an ideal propagation path between the reflector 8 and a respective output waveguide 18. Small-scale "errors" in reflector position cause lateral and/or angular offsets in the propagation path of each light beam 16, with corresponding increases in insertion loss. In the embodiments of FIGS. 4a and 4b, this phenomenon is exploited to obtain dynamic channel equalization, by enabling channel-specific control of insertion loss. Thus the embodiments of FIGS. 4a and 4b are obtained by replacing the fixed reflectors 8 of FIGS. 1 and 2, respectively, with a Micro-Electromechanical (MEMs) array 32 of independently controllable micro-mirrors (not shown). Each micro-mirror is controlled in a known manner to provide small-scale analog adjustment of mirror position. This arrangement enables higher-power channel light beams (which may be detected in a conventional manner) to be individually "walked off" their respective output waveguides 18 (as illustrated by the fine line in FIGS. 4a and 4b) either by angular displacement in FIG. 4a, or lateral displacement in FIG. 4b, to increase their insertion loss and thereby equalize channel power of each channel of the WDM light beam 12 to that of the weakest channel.

It will be appreciated that the DCEs 30 of FIGS. 4a and 4b are closely similar to the demuxers 2 of FIGS. 1 and 2, in that they provide non-flat top and flat top performance, respectively.

Figure 4C:
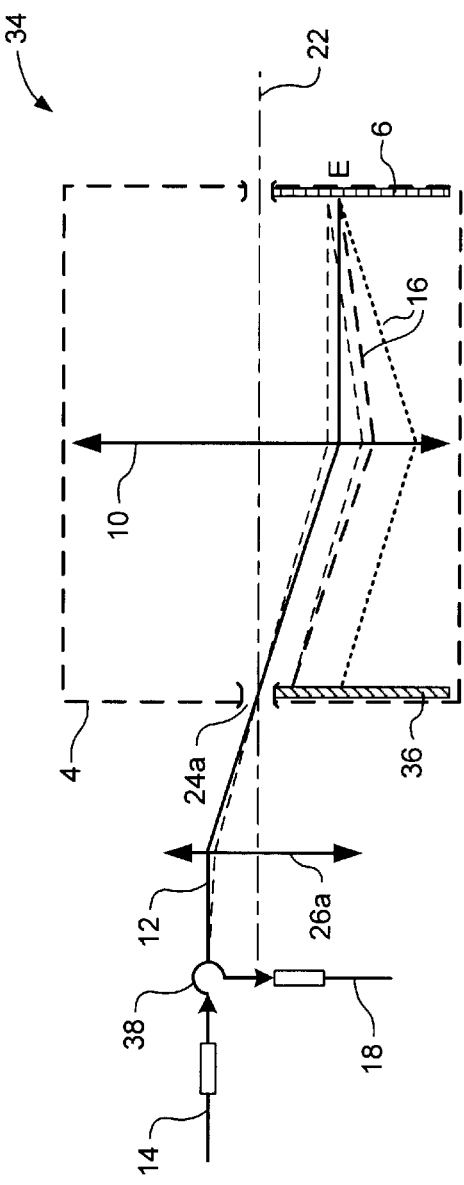

FIG. 4c illustrates a multiplexed version of a flat top DCE 30, in which the micro-mirrors of the MEMS array 32 are positioned to reflect each channel light beam back along its incident propagation path toward the input waveguide 14. A conventional optical circulator 38 is coupled between the optical core 4 and the input and output waveguides 14,18. The optical circulator 38 operates in a conventional manner to direct the inbound WDM light beam 12 from the input waveguide 14 into the optical core 4, and direct the outbound WDM light beam 12 from the optical core 4 into the output waveguide 18. As in the embodiments of FIGS. 4a and 4b, dynamic channel equalization is obtained by adjusting each micro-mirror of the MEMS array 32 to control the insertion loss of their respective channel light beam into the circulator 38 and output waveguide 18.

Figure 4D:
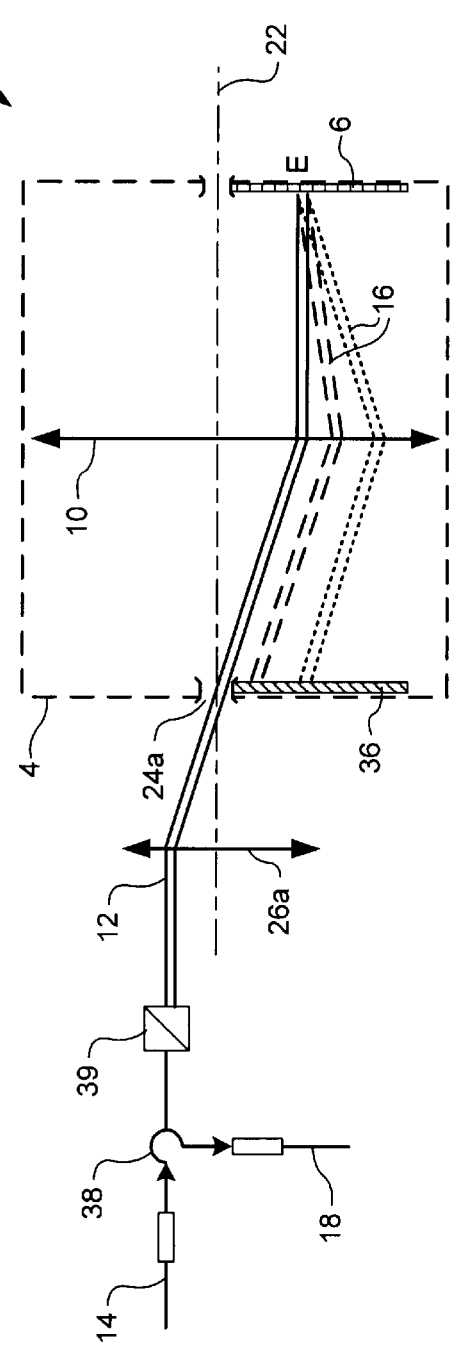

FIG. 4d illustrates a still further variation of the multiplexed flat top DCE 30. This embodiment is closely similar to that of FIG. 4c, except that a polarization beam splitter/combiner is inserted between the circulator 38 and the optical core 4. The polarization beam splitter/combiner 39 operates to split the input WDM light beam 12 into a pair of orthogonally polarized light beams which are redirected to propagate in parallel (e.g., horizontally separated), with one beam passed through a polarization rotator, so that both beams pass through the optical core 4 having a same polarization state. The dispersion element 6 diffracts each of the orthogonally polarized light beams into respective sets of channel light beams. Each channel light beam is then made incident on a respective micro-mirror of the MEMS array. Thus, for each channel, a pair of orthogonally polarized channel light beams are diffracted by the dispersion element 6, and are subsequently received a respective pair of micro-mirrors of the MEMS array 36. With this arrangement, the insertion loss of each orthogonally polarized channel light beam into the circulator 38 and output waveguide 18 can be independently controlled. As a result, in addition to the channel-specific DCE functionality of the embodiments of FIGS. 4a–4c, the embodiment of FIG. 4d is also capable of actively compensating Polarization Dependent Loss (PDL), on a per-channel basis.

As described above, dynamic channel equalization can be obtained by small-scale analog adjustment of MEMS mirror position to yield corresponding fine control of insertion loss. Insertion losses increase with increasing excursions in micro-mirror position, until the insertion loss is sufficient. At the maximum extinction, the DCEs 30 of FIGS. 4a and 4b will operate as controllable channel blockers.

As may be appreciated, in situations where only the channel-blocker functionality is required, the analog MEMS array 32 can be replaced by a less expensive array of bi-stable micro-mirrors. An alternative embodiment of the invention, implemented as a single-purpose channel blocker 34, is illustrated in FIG. 5.

Figure 3B:
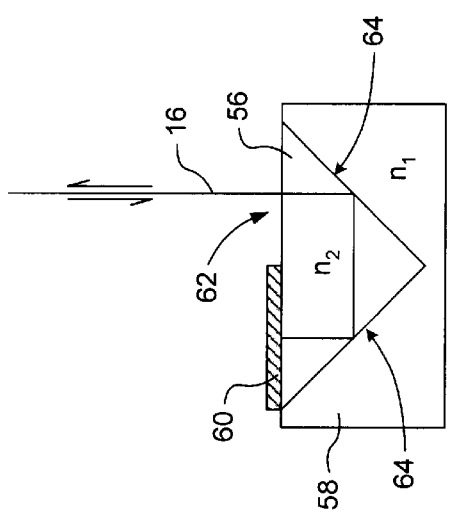
FIGS. 3a–c show principle elements and characteristics of alternative reflectors usable in embodiments of the present invention.
Figure 5:
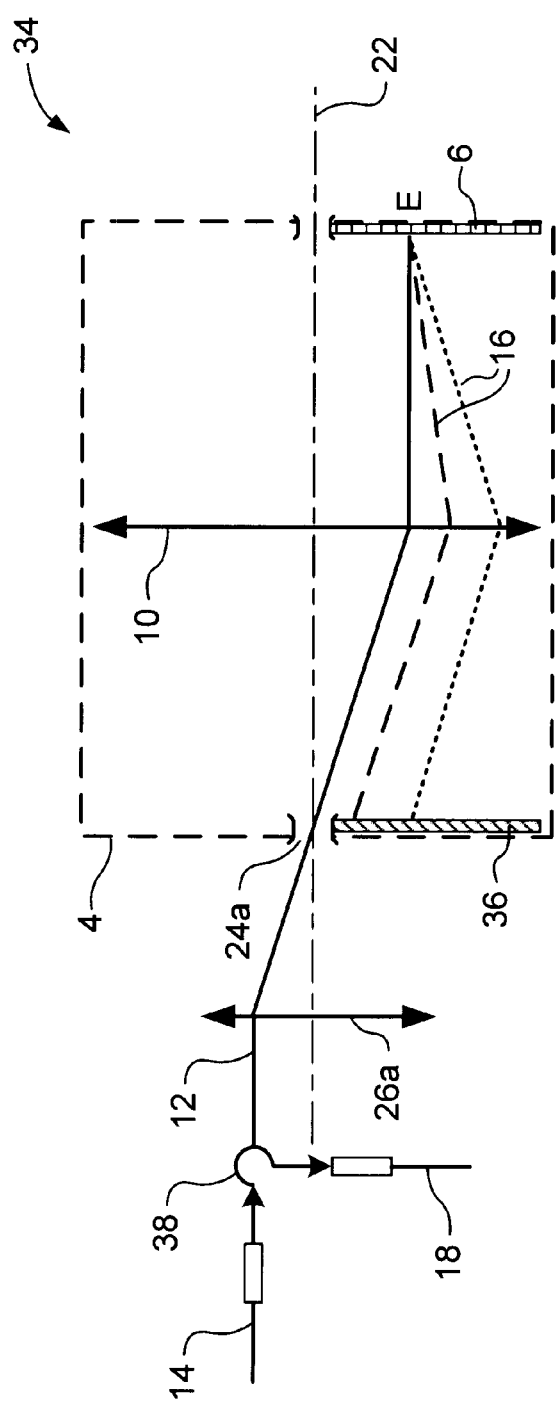
FIG. 5 is a schematic illustration showing principle elements and operation of an embodiment of the present invention implemented as a wavelength channel blocker.

In the embodiment of FIG. 5, the (analog or bi-stable) MEMS array reflector 32 is replaced by a controllable retro-reflector 36. As is known in the art, a retro-reflector operates (by either reflection or total internal reflection (TIR)) to reflect a light beam back along its incident propagation path. FIG. 3b is a cross-sectional view showing principle components and operation of a total internal reflection(TIR) retro-reflector 36. As shown in FIG. 3b, the TIR retro-reflector 36 comprises a prism 56 (having a refractive index $n_2$) bounded by a region 58 of lower refractive index $n_1$ (thus $n_1<n_2$). A fixed mirror 60 covers a portion of the prism 56, leaving a window 62 for ingress and egress of light. With this arrangement, a channel light beam 16 enters the prism through the window 62; is reflected at the $n_2/n_1$ interfaces 64 and hits the mirror 60. The channel light beam 16 will then retrace the same route back out of the retro-reflector 36.

In the embodiment of FIG. 5, this functionality is used to reflect the channel light beams 16 back toward the input waveguide 14. A conventional optical circulator 38 is coupled between the optical core 4 and the input and output waveguides 14,18. The optical circulator 38 operates in a conventional manner to direct the inbound WDM light beam 12 from the input waveguide 14 into the optical core 4, and direct the outbound WDM light beam 12 from the optical core 4 into the output waveguide 18. Channel blocking functionality is obtained by controlling the retro-reflector 36 to frustrate reflection of one or more channel light beams 16. Controllable retro-reflectors 36 capable of this type of operation are known, such as, for example "Fiberkey" (Tradename), an optical switch manufactured by Optical Switch Corp. An array of bi-stable micro-mirrors can also be used, if desired.

Figure 3C:
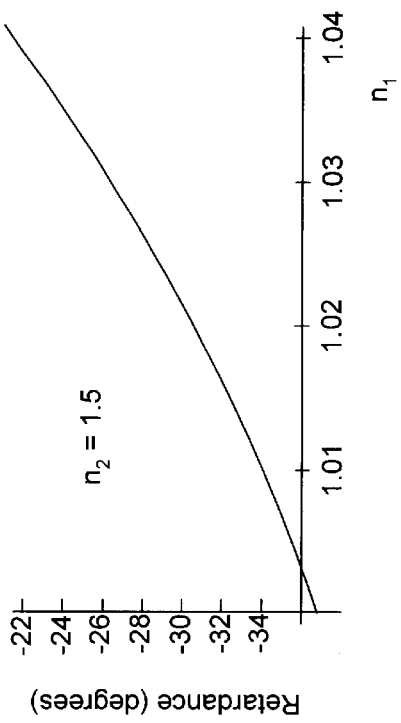
Figure 3A:
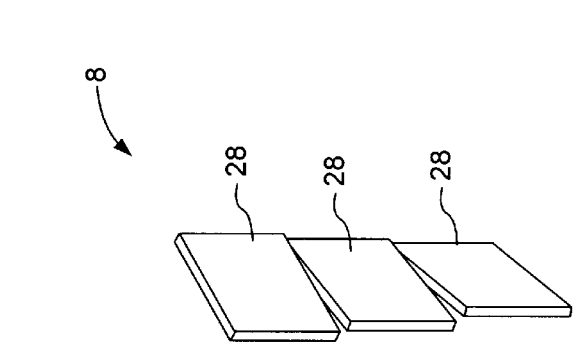

As is known in the art, total internal reflection of a light beam at an interface 64 (FIG. 3b) between high and low regions of refractive index causes a relative phase shift in orthogonal polarizations of the light beam. As shown in FIG. 3c, the degree of phase shift (referred to as retardance) is generally a function of the difference in refractive index across the interface. Thus the retardance can be modulated by changing the refractive index of the media on one (or both) sides of the interface. Various known methods of modulating refractive index may be used for this purpose (such as, for example, differential heating; electric fields; or bringing a material close to, but not touching, the interface). Modulating the retardance changes the state of polarization of the channel light beam, and may be used for such purposes as switching, control of polarization mode dispersion (PMD), etc.

Figure 6A:
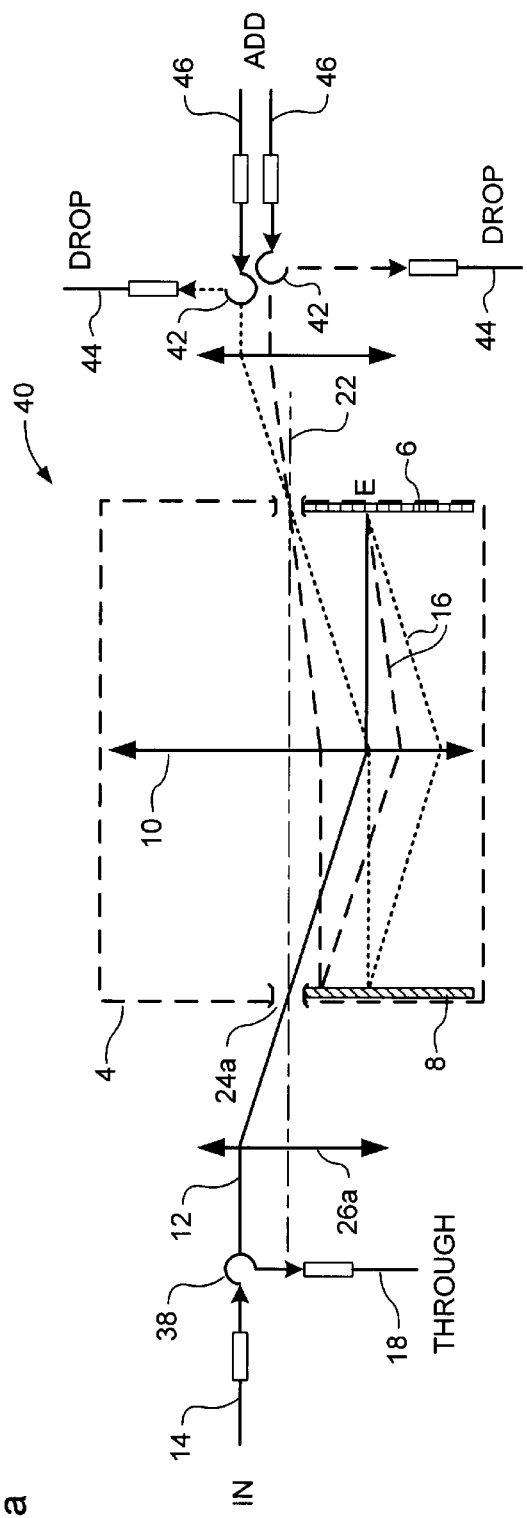
FIGS. 6a and 6b are schematic illustrations showing principle elements and operation of respective alternative embodiments of the present invention implemented as an Add-Drop Multiplexer (ADM)
Figure 6B:
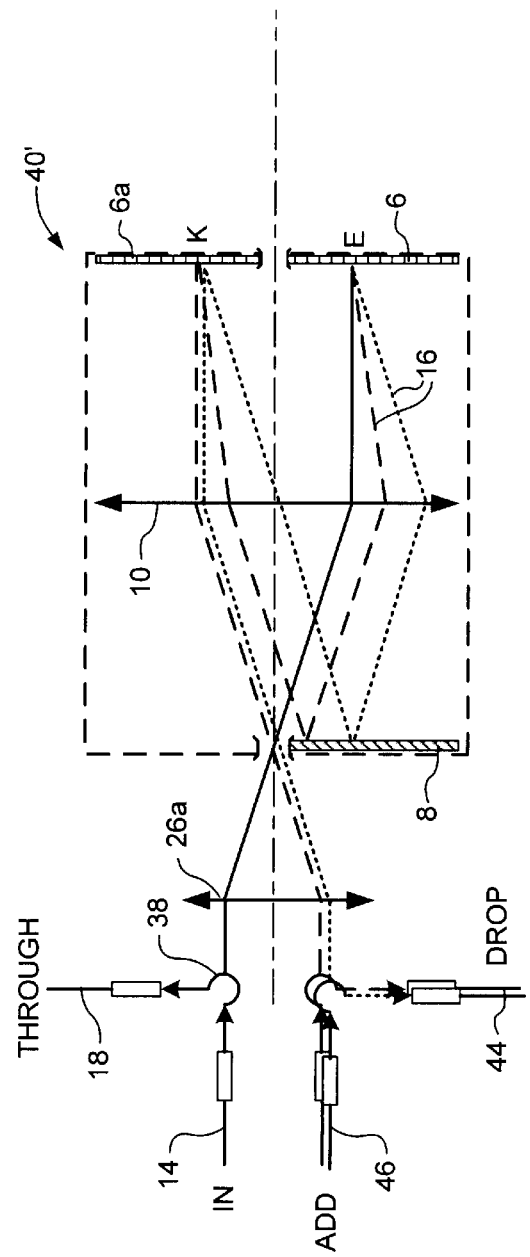

FIGS. 6a and 6b illustrated principle elements of respective embodiments of the present invention deployed as Add Drop Multiplexers (ADMs) 40. As with the embodiments of FIGS. 4a and 4b, the embodiments of FIGS. 6a and 6b are similar to the embodiments of FIGS. 1 and 2 in that they provide non-flat top and flat top performance, respectively. In order to implement an ADM 40, a first optical circulator 38 is provided to couple an inbound WDM light beam 12 between an "input" waveguide 14 and the optical core 4, and couple an out-bound WDM light beam 12 between the switch core 4 and a "through" (or output) waveguide 18. On the opposite side of the core 4, one or more respective channel circulators 42 are used to couple a channel light beam 16 being dropped from the WDM light beam into a respective "drop" waveguide 44; while simultaneously coupling a new channel light beam 16' being added to the WDM light beam 12 from a respective "add" waveguide 46 and into the optical core 4.

As may be appreciated, light beams will thus be propagating bi-directionally through the optical core 4. An inbound multi-channel WDM light beam 12 is received through the input and add waveguides 14 and 46, while the outbound WDM light beam exits the device 40 via the through and drop waveguides 18 and 44. Both the inbound and outbound WDM light beams may well have the same channel schedule (i.e., number of channels, and wavelength of each channel). However, the add and drop function enables optical signal traffic in each channel of the outbound WDM light beam to be arbitrarily different from that of the inbound WDM light beam.

Figure 7A:
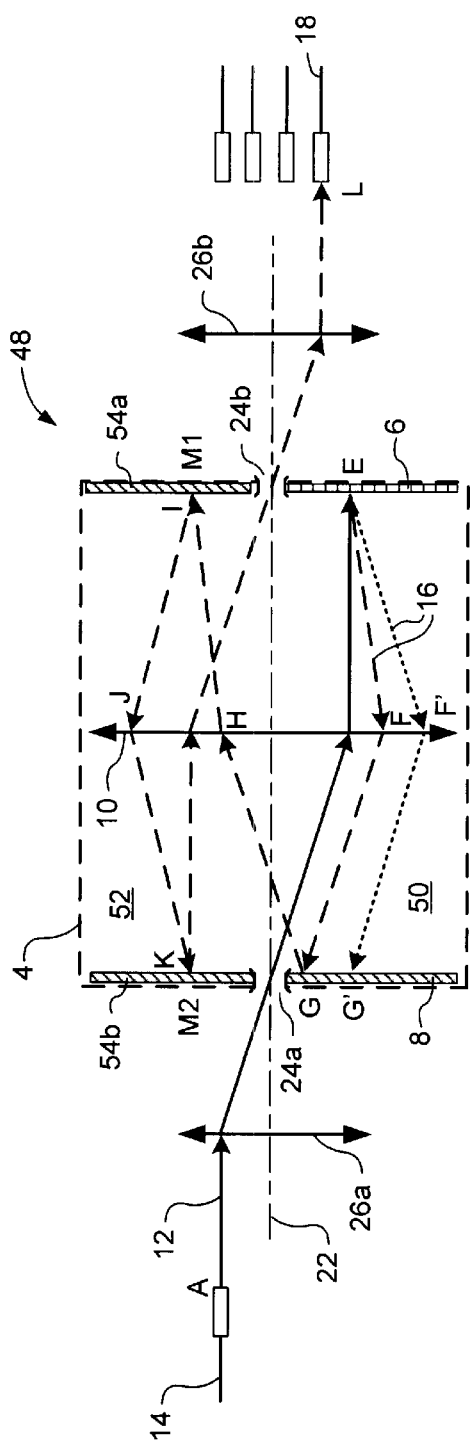
FIGS. 7a and 7b are schematic illustrations showing principle elements and operation of respective alternative embodiments of the present invention implemented as a channel switch.
Figure 7B:
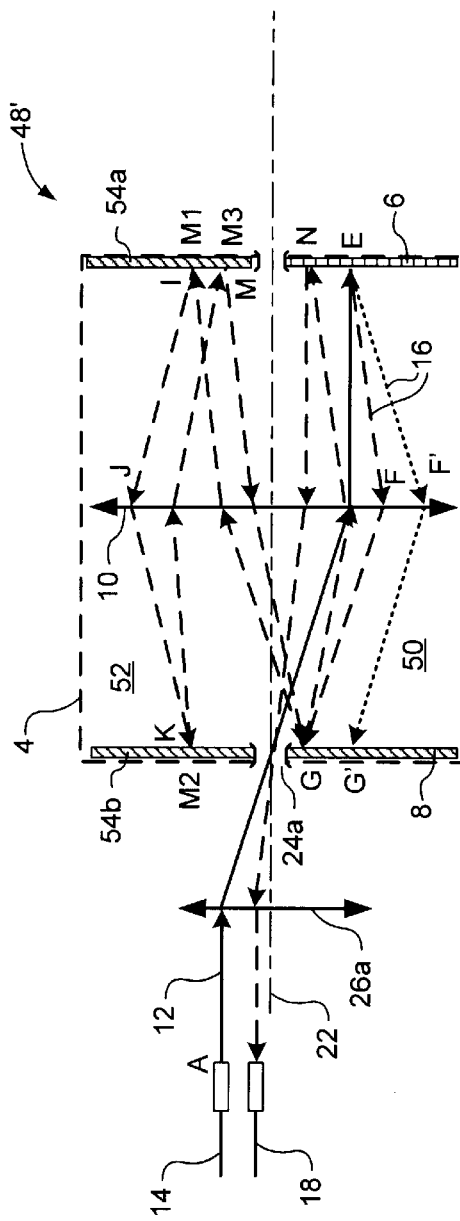

FIGS. 7a and 7b illustrate principle elements of respective embodiments of the present invention deployed as a wavelength switch 48. As with the previously described embodiments of FIGS. 1, 4a and 6a, the embodiment of FIG. 7a includes a single reflection from the dispersion element 6, and so provides non-flat top performance. Conversely, the embodiment of FIG. 7b uses a second reflection from the dispersion element 6 (as per the embodiments of FIGS. 2, 4b and 6b) to correct dispersion of channel light beams 16, and so achieve flat-top performance.

As may be appreciated, full wavelength switching functionality requires the ability to switch any channel light beam 16 from an input waveguide 14 to any one of M output waveguides 18. Preferably, this functionality can be provided, in parallel, for up to N input waveguides 14, to yield N×M switching. For ease of illustration, the path traced by a single channel light beam 16 switched through the wavelength switch 48 between respective input and output waveguides 14,18 is shown. It will be understood, however, that each channel light beam 16 will follow its own path through the switch 48 between the input waveguide 14, and any one of a plurality of output waveguides 18.

Referring now to FIG. 7a, the demultiplexing wavelength switch 48 is composed of a wavelength demultiplexer 50 (positioned below the optical axis 22 in FIG. 7a, and closely similar to that described above with reference to FIG. 1), in combination with an optical switch 52 (positioned above the optical axis 22 in FIG. 7a) composed of a pair of arrays 54 of independently controllable deflectors, such as MEMs mirrors disposed in or near opposite focal planes of the ATO element 10.

Operation of the embodiment of FIG. 7a to switch each channel of a received WDM light beam 12 is shown by the solid and dashed lines of FIG. 7a. For ease of illustration, the multiplexed WDM light beam 12 is illustrated by a solid line, while demultiplexed channel light beams 16 are shown as dashed lines. Similarly, for ease of illustration, the WDM light beam 12 is considered to be composed of two channels, only one of which is traced through the wavelength switch 48 to a selected output waveguide 18. It will be appreciated, however, that more than two channels per WDM light beam 12 can be readily accommodated by the present invention. Thus, the WDM light beam 12 enters the wavelength switch 48 through a respective input waveguide 14 (at A) and propagates through the optical core 4 to the dispersion element 6 (at E). Each channel light beam 16 propagates away from the dispersion element 6 at a unique angle, and passes through the ATO element 10 (at F and F') which deflects the channel light beams toward the reflector 8.

As in the embodiment of FIG. 2, the reflector 8 may be provided as a simple fixed mirror (having one or more fixed reflective surfaces) designed to reflect incident channel light beams 16 through a common angle in (θy) out of the dispersion plane of the dispersion element 6, and at unique angles for each wavelength in the dispersion plane (θx) in order to maintain the wavelength separation. Thus a channel light beam 16 is reflected by the reflector (at G and G') and passes through the ATO element 10 (at H), which images one channel light beam 16 onto a predetermined mirror M1 (at I) within a first MEMS array 54a. Since all of the optical elements between the input waveguide 14 and mirror M1 are fixed, mirror M1 will be associated with one channel of the input waveguide 14, and receives only that one channel light beam 16. However, mirror M1 is also independently movable to deflect the channel light beam 16 to any one of the mirrors of the second MEMS array 54b on the opposite side of the ATO element 10. Each mirror of this second MEMS array 54b is associated with one respective output waveguide 18, and is independently movable to deflect a light beam received from any mirror of the first MEMS array 54a into that output waveguide 18. Thus in the embodiment of FIG. 7a, the channel light beam 16 can be switched into any output waveguide 18 by controlling mirror M1 to deflect the channel light beam 16 through the ATO element 10 (at J) to the associated mirror (M2 at K) associated with the selected output waveguide 18. Mirror M2 is then controlled to deflect the channel light beam 16 to the output waveguide 18 (at L) via the ATO element 10, output optical bypass 24b and output relay lens 26b.

As mentioned previously, each channel light beam 16 is made incident on a unique single mirror M1 of the first MEMS array 54a. Thus it will be apparent that multiple input waveguides 14, and multiple channels per WDM light beam 12 can readily be accommodated by providing the first and second MEMS array 54a,54b with a total number of mirrors that at least equals the total number of input channels (that is, the number of input waveguides 14 multiplied by the number of channels per waveguide). Each channel light beam 16 can then be switched to a selected mirror within the second MEMS array 54b, which then deflects the channel light beam 16 to its respective output waveguide 18.

The embodiment of FIG. 7b is similar to that of FIG. 7a, with the exception that the propagation path of each channel light beam 16 includes a second reflection from the dispersion element 6 to achieve flat-top performance and to remultiplex the outputs. Thus mirror M2 deflects the channel light beam 16 to a third mirror (M3 at M) within the first MEMS array 54a. Mirror M3 then deflects the channel light beam 16 back through the ATO element 10 to the reflector 8 (at G), which then reflects the channel light beam 16 to the dispersion element 6 (at N). The channel light beam 16 is reflected by the dispersion element 6, and then passes through the ATO element 10, optical bypass 24a, and relay lens 26b before reaching the selected output waveguide 18.

In this embodiment, the first MEMS array 54a must include at least two mirrors (M1 and M3) for each channel. In this case, mirror M1 is associated with one input waveguide 14 (as described above), while mirror M3 is associated with one output waveguide 18. Mirror M2 is associated with mirror M1, and is used to switch the channel light beam received from M1 to M3 in order to select the desired output waveguide 18.

As may be seen in FIG. 7b, between mirror M3 and the output waveguide 18, each channel light beam follows a "reverse" path through the demultiplexer section 50 of the wavelength switch 48'. As mentioned previously, such a reverse path yields a multiplexing function, so that multiple channel light beams 16 can be multiplexed into the output waveguide 18. This contrasts with the embodiment of FIG. 7a, in which each channel light beam 16 exits the wavelength switch 48 via a respective output waveguide 18.

Thus it will be seen that the present invention provides a simple, compact and efficient design for implementing a variety of optical signal processing devices. All of these devices are built upon a "base" of an optical demultiplexer provided by a dispersion element and a reflector disposed in or near opposite focal planes of an optical element having optical power.

The embodiment(s) of the invention described above is (are) intended to be exemplary only. The scope of the invention is therefore intended to be limited solely by the scope of the appended claims.

We claim:

1. An optical device for wavelength dependent processing of optical signals, the optical device comprising:
   a dispersion element adapted to separate an input wave-division multiplexed (WDM) light beam received from an input port of the optical device into two or more diffracted channel light beams;
   a reflector arranged to reflect at least one of the diffracted light beams toward at least one output port of the optical device;
   an angle-to-offset (ATO) element having a focal length approximately equal to a near zone length or Rayleigh range of the beam of light incident on the ATO element, said ATO element disposed in a propagation path of the diffracted light beams between the dispersion element and the reflector;
   whereby the dispersion element, reflector and ATO element cooperate to optically demultiplex the input WDM light beam.

2. An optical device as claimed in claim 1, wherein the ATO element is a curved mirror.

3. An optical device as claimed in claim 2, wherein both the dispersion element and the reflector are disposed in or near the focal plane of the mirror.

4. An optical device as claimed in claim 1, wherein the ATO element is a lens.

5. An optical device as claimed in claim 4, wherein the dispersion element and the deflector are disposed in or near respective opposite focal planes of the lens.

6. An optical device as claimed in claim 1, wherein the reflector comprises an array of two or more reflective elements disposed in or near a focal plane of the ATO element.

7. An optical device as claimed in claim 6, wherein each reflective element is arranged in a propagation path of a respective diffracted light beam from the dispersion element, via the ATO element.

8. An optical device as claimed in claim 7, wherein each reflective element is fixed.

9. An optical device as claimed in claim 8, wherein the reflective elements are oriented at a common angle in a dispersion plane of the dispersion element.

10. An optical device as claimed in claim 9, wherein each reflective element is oriented at a respective unique angle out of a dispersion plane of the dispersion element.

11. An optical device as claimed in claim 10, wherein the reflective elements redirect the diffracted light beams to the dispersion element prior to coupling to a plurality of output ports.

12. An optical device as claimed in claim 11 comprising a plurality of input ports m, disposed in a linear array, and a plurality of output ports m*n disposed in a two dimensional array.

13. An optical device as claimed in claim 11, wherein each reflective element is independently moveable.

14. An optical device as claimed in claim 13 further including a plurality of bidirectional add/drop ports, wherein the independently moveable mirrors have a first position to direct a beam to a through port and a second position to direct a beam to an associated add/drop port.

15. An optical device as claimed in claim 7, wherein each reflective element is independently moveable.

16. An optical device as claimed in claim 15, wherein each reflective element is bi-stable.

17. An optical device as claimed in claim 15, wherein each reflective element is adjustable in response to an analog control signal.

18. An optical device as claimed in claim 7, wherein each reflective element comprises a mirror.

19. An optical device as claimed in claim 7, wherein each reflective element comprises a total internal reflection (TIR) element.

20. An optical device as claimed in claim 19, wherein each reflective element is independently controllable to selectively attenuate or substantially block reflection of light from the respective reflective element.

21. An optical device as claimed in claim 19, wherein each of the TIR elements is independently controllable to control the retardance of the light for the respective TIR element.

22. An optical device as claimed in claim 1, further comprising an optical switch disposed in the propagation path of channel light beams between the reflector and the output port of the optical device, the optical switch being adapted to switch each diffracted light beam to a selected output waveguide of a plurality of output waveguides.

23. An optical device as claimed in claim 22, wherein the optical switch comprises first beam deflector array including at least two independently controllable beam deflectors, each beam deflector of the first array being arranged to receive a respective channel light beam from the reflector, via the ATO element, and second beam deflector array including at least two independently controllable beam deflectors, each beam deflector of the second array being arranged to receive a channel light beam from any beam deflector of the first array, via the ATO element, and adapted to switch the received channel light beam to a selected one of the array of output ports.

24. An optical device for wavelength dependent processing of optical signals, the optical device comprising:

an angle-to-offset (ATO) element having optical power;

a dispersion element disposed substantially in or near the focal plane of the ATO element, for separating an input wavelength division multiplexed (WDM) light beam received from an input port of the optical device via the ATO element, into two or more light beams comprising individual channel wavelength bands; and, a reflector disposed substantially in or near the focal plane of the ATO element comprising an array of at least two reflective elements oriented at a common angle in a dispersion plane of the dispersion element, and having respective unique angles out of a dispersion plane of the dispersion element, said reflector for redirecting at least one separated channel wavelength band to a diffraction element to recombine wavelengths within at least one channel wavelength band, such that the recombined wavelength band is directed to a selected output port of the device via at least the ATO element.

25. An optical device as claimed in claim 24 wherein each reflective element is independently moveable.

26. An optical device as claimed in claim 25 further including a plurality of bidirectional add/drop ports, wherein the independently moveable mirrors have a first position to direct a beam to a through port and a second position to direct a beam to an associated add/drop port.

* * * * *